(12) United States Patent
Cronin et al.

(10) Patent No.: US 10,291,624 B1
(45) Date of Patent: May 14, 2019

(54) TRUSTED SYSTEM FOR A USER PROFILE

(71) Applicant: Synaptics Incorporated, San Jose, CA (US)

(72) Inventors: John Cronin, Bonita Springs, FL (US); Joseph George Bodkin, South Burlington, VT (US)

(73) Assignee: Synaptics Incorporated, San Jose, CA (US)

( * ) Notice: Subject to any disclaimer, the term of this patent is extended or adjusted under 35 U.S.C. 154(b) by 140 days.

(21) Appl. No.: 15/393,076

(22) Filed: Dec. 28, 2016

Related U.S. Application Data

(60) Provisional application No. 62/272,895, filed on Dec. 30, 2015.

(51) Int. Cl.
*H04L 29/06* (2006.01)
*H04L 9/32* (2006.01)
*H04W 12/06* (2009.01)

(52) U.S. Cl.
CPC .......... *H04L 63/102* (2013.01); *H04L 9/3231* (2013.01); *H04L 63/0861* (2013.01); *H04W 12/06* (2013.01)

(58) Field of Classification Search
CPC . H04L 63/102; H04L 9/3231; H04L 63/0861; H04W 12/06
See application file for complete search history.

(56) References Cited

U.S. PATENT DOCUMENTS

| | | | |
|---|---|---|---|
| 6,810,309 B2 | 10/2004 | Sadler et al. | |
| 7,116,211 B1 | 10/2006 | Parker | |
| 9,426,225 B2 * | 8/2016 | Penilla | H04W 4/046 |
| 2003/0152088 A1 * | 8/2003 | Kominami | B60N 2/0248 |
| | | | 370/401 |
| 2005/0210270 A1 | 9/2005 | Rohatgi et al. | |
| 2007/0162760 A1 * | 7/2007 | Samuelsson | G06F 21/6227 |
| | | | 713/182 |

(Continued)

FOREIGN PATENT DOCUMENTS

| | | |
|---|---|---|
| DE | 10103044 | 7/2002 |
| KR | 1020150115506 | 10/2015 |
| WO | WO 2014/172321 | 10/2014 |

OTHER PUBLICATIONS

Park, Jong Hyuk. "C-iUMS: Context Based Smart and Secure Multimedia Service in Intelligent Ubiquitous Home," In *Lecture Notes in Computer Science* (including subseries Lecture Notes in Artificial Intelligence and Lecture Notes in Bioinformatics), vol. 4097 LNCS, pp. 660-670 (2006).

(Continued)

*Primary Examiner* — Brandon S Hoffman
*Assistant Examiner* — William A Corum, Jr.
(74) *Attorney, Agent, or Firm* — Leydig, Voit & Mayer, Ltd.

(57) ABSTRACT

Disclosed is a system including a user device and a networked device for providing security and customization of the networked device. Example networked devices include IoT (Internet of Things) devices, such as electronics, software, sensors, network devices, and so on. In the disclosure, a user authenticates with the user device using a biometric. The user device transmits a user profile or settings information, optionally along with user biometric information, to the networked device to operate the networked device.

14 Claims, 7 Drawing Sheets

(56) References Cited

U.S. PATENT DOCUMENTS

| | | | |
|---|---|---|---|
| 2008/0317292 A1* | 12/2008 | Baker | G06K 9/00006 |
| | | | 382/115 |
| 2009/0023393 A1 | 1/2009 | Behzad et al. | |
| 2010/0097178 A1 | 4/2010 | Pisz et al. | |
| 2013/0154796 A1 | 6/2013 | Diab et al. | |
| 2014/0249853 A1 | 9/2014 | Proud et al. | |
| 2014/0310788 A1 | 10/2014 | Ricci | |
| 2016/0036788 A1* | 2/2016 | Conrad | G07C 9/00571 |
| | | | 713/168 |
| 2016/0036814 A1* | 2/2016 | Conrad | H04L 63/0876 |
| | | | 713/171 |
| 2016/0135046 A1* | 5/2016 | John Archibald | H04W 12/06 |
| | | | 455/411 |
| 2016/0300224 A1* | 10/2016 | Liu | G06F 21/34 |
| 2016/0359864 A1* | 12/2016 | Dhaliwal | H04L 63/102 |
| 2017/0126691 A1* | 5/2017 | Arcese | H04L 63/102 |
| 2017/0185980 A1* | 6/2017 | Wurmfeld | G06Q 20/1085 |

OTHER PUBLICATIONS

El-Basioni, et al. "Smart Home Design using Wireless Sensor Network and Biometric Technologies," International Journal of Application or Innovation in Engineering & Management (IJAIEM), vol. 2, Iss. 3, pp. 413-429 (Mar. 2013).

\* cited by examiner

TRUSTED SYSTEM FOR A USER PROFILE

CROSS-REFERENCE TO RELATED APPLICATIONS

This application claims the benefit of U.S. Provisional Application No. 62/272,895, filed on Dec. 30, 2015, which is hereby incorporated by reference in its entirety.

FIELD

This disclosure generally relates to computing technology and, more particularly, to a trusted system for a user profile.

BACKGROUND

Biometric authentication systems are used for authenticating and/or verifying users of devices incorporating the authentication systems. Biometric sensing technology provides a reliable, non-intrusive way to verify individual identity for recognition purposes.

Fingerprints, like various other biometric characteristics, are based on distinctive personal characteristics and are, thus, a reliable mechanism for recognizing an individual. There are many potential applications for using fingerprint sensors. For example, fingerprint sensors may be used to provide access control in stationary applications, such as security checkpoints. Electronic fingerprint sensors may also be used to provide access control in mobile devices, such as cell phones, wearable smart devices (e.g., smart watches and activity trackers), tablet computers, personal data assistants (PDAs), navigation devices, and portable gaming devices. Accordingly, some applications, in particular applications related to mobile devices, may require authentication systems that are both small in size and highly reliable.

SUMMARY

One embodiment of the disclosure provides a method for authorizing access to a networked device. The method includes: storing, on a user device, user profile data associated with the networked device; storing, on the user device, enrolled user biometric information associated with a user; receiving, by the user device, biometric input from the user; matching, by the user device, the biometric input to the enrolled user biometric information; and transmitting, by the user device to the networked device, the user profile data to control operation of the networked device by applying one or more settings included in the user profile data. Some embodiments further include a non-transitory computer-readable storage medium storing instructions that, when executed by a computing device, perform the method for authorizing access to a networked device.

Another embodiment of the disclosure provides a system comprising a user device and a networked device. The networked device is configured to: establish a connection between the networked device and an application stored on the user device, wherein a user has authenticated on the user device using biometric information; receive, from the application over a network, a key code and encrypted user profile data; decrypt the encrypted user profile data using the key code to generate decrypted user profile data; and complete a transaction based on the decrypted user profile data.

DETAILED DESCRIPTION

Figure 1:
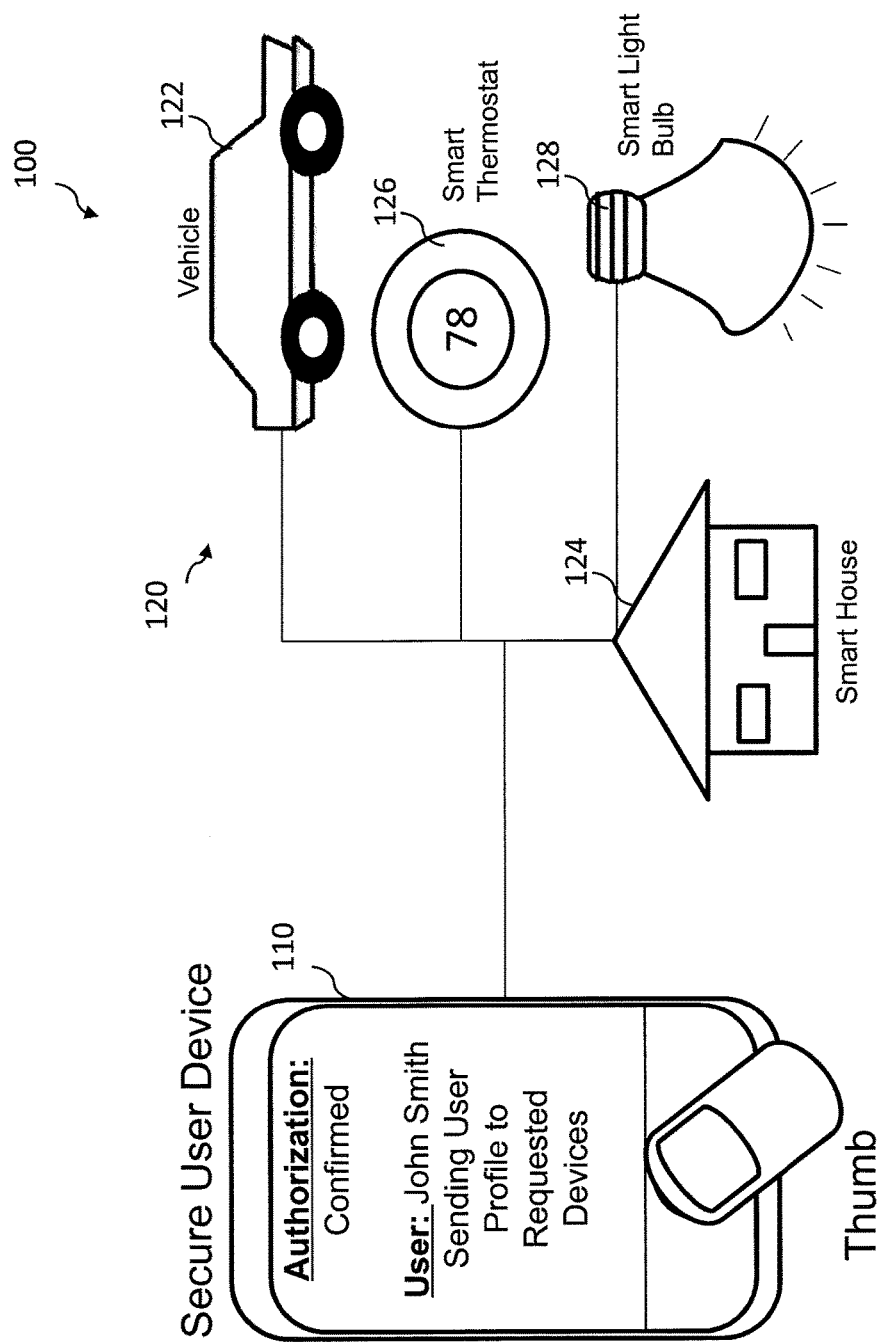
FIG. 1 is a block diagram illustrating a suitable computing environment for providing user profile information along with user biometric information to connected devices, according to an embodiment.

Disclosed is a system for providing security and customization of networked devices or objects for users of such networked devices or objects. Example networked devices or objects include IoT (Internet of Things) devices, such as electronics, software, sensors, network devices, and so on.

In the disclosed embodiments, a secure user device (e.g., a smart phone) may communicate with and transfer a user profile or settings information along with user biometric information to a networked device or object to control the networked device or object. As such, the disclosed system is configured to facilitate collection and exchange of information by and between the secure user device and the networked device or object.

Typically, networked devices have generic default settings or provide a user with an option to adjust the settings once the user has made a connection to the device. For example, the user may either accept the default settings of the device, or may adjust the settings each time a connection has been made. In addition, multiple users may attempt to connect to the networked devices, constantly or periodically. The multiple users may change the default settings of the device, which takes away from the customization aspect of the device, because a given user may input their own settings each time a connection is made and override a previous setting that may have been input by a different user.

In the present disclosure, a user inputs user options for one or more connected devices (e.g., IoT devices) on a secure device (e.g., a smart phone) and the user options are stored in a storage device as a user profile. The user profile can also be stored along with the user's biometric information (e.g., a fingerprint) on the secure device. In some implementations, the user profile may represent "high value payload information," which may be useful to a variety of service providers, such as mobile payment providers and other end service providers of networked devices. Although the biometric information is described as a fingerprint in some embodiments, other biometrics (e.g., face image, iris images, etc.) are also within the scope of the disclosure.

In operation, a user authenticates on a secure device (e.g., smart phone) using biometric information (e.g., a fingerprint). Once the user's biometric is verified by the secure device, the secure device encrypts the biometric information and stores the biometric information on the secure device. The secure device also stores an encrypted user profile (i.e., formed from user inputs) used for customization or operation of a networked device. A networked device (e.g., a vehicle, a smart thermostat, a smart light bulb, a smart house, etc.) may then request authorization from the secure device, and the secure device sends encrypted user profile (and optionally the encrypted biometric) to the requesting networked device. The networked device stores a key code, which can decode the encrypted user profile received from the secure device, in order to process the received data and apply user inputs or information from the user profile. Optionally, in embodiments where the encrypted biometric is also transmitted from the secure device to the networked device, the networked device is configured to decrypt the biometric and compare the biometric to a biometric template stored on the networked device.

The system, therefore, stores a user profile (or device profile), optionally along with the user's biometric information, and provides customization options for various IoT devices. Each IoT device utilizes a decryption key code to decrypt the user profile (or device profile), and applies the decrypted customization options from the user profile (or device profile). Optionally, the networked device also verifies by the user's biometric before applying the decrypted customization options.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The terminology used herein is to be interpreted in its broadest reasonable manner, even though it is being used in conjunction with a detailed description of certain specific examples.

FIG. 1 is a block diagram illustrating a suitable computing environment 100 for providing user profile information along with user biometric information to connected devices, according to an embodiment. The computing environment 100 may include a secure user device 110, which may include one or more biometric sensors, such as sensors that receive, capture, or measure fingerprint information (e.g., images) from a finger (e.g., thumb) of a user associated with the secure user device 110. The system may communicate various information described herein to one or more networked devices 120 (for example, within an IoT network), such as a smart vehicle 122, devices within a smart house 124, such as a smart thermostat 126 and/or smart light bulb 128, and so on.

The system may store a dynamically updated user profile along with user biometric information on the secure user device 110. For example, the user profile may include: a collection of user preferences or settings for a networked device 120, such as age, a temperature setting of a car or house, a social security number, a PIN, and so on. The user profile may be configured as a data structure or template that is understood by the various networked devices 120. A secure user device 110 can be opened or unlocked via a biometric. Upon request from a networked device 120 or an application on the secure user device 110 associated with the networked device, the secure user device 110 sends an encrypted user profile to the networked device 120. The networked device 120 receives the user profile, decrypts the user profile, reads preference or setting information from the decrypted user profile, and adjusts or modifies operation of the networked device 120 based on the preference or setting information of the user profile that is applicable to the networked device 120.

Thus, the system enables the secure user device 110 to connect with various networked devices 120, such as a vehicle, a thermostat, lights, and so on, and provides the user of the secure user device 110 the security of customizing the networked devices 120 without exposing valuable data, among other benefits, as described herein.

Further details regarding the systems, devices, methods, and routines utilized to provide and/or implement various aspects of providing profile information along with biometric information within the IoT network will be described herein. Some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

FIG. 1 and the discussion herein provide a brief, general description of a suitable computing environment 100 in which the system can be supported and implemented. Although not required, aspects of the system are described in the general context of computer-executable instructions, such as routines or instructions executed by a processor of computing device, e.g., mobile device, a server computer, or personal computer (PC). Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like.

Aspects of the system can also be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system may reside on a server computer, while corresponding portions may reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Figure 2:
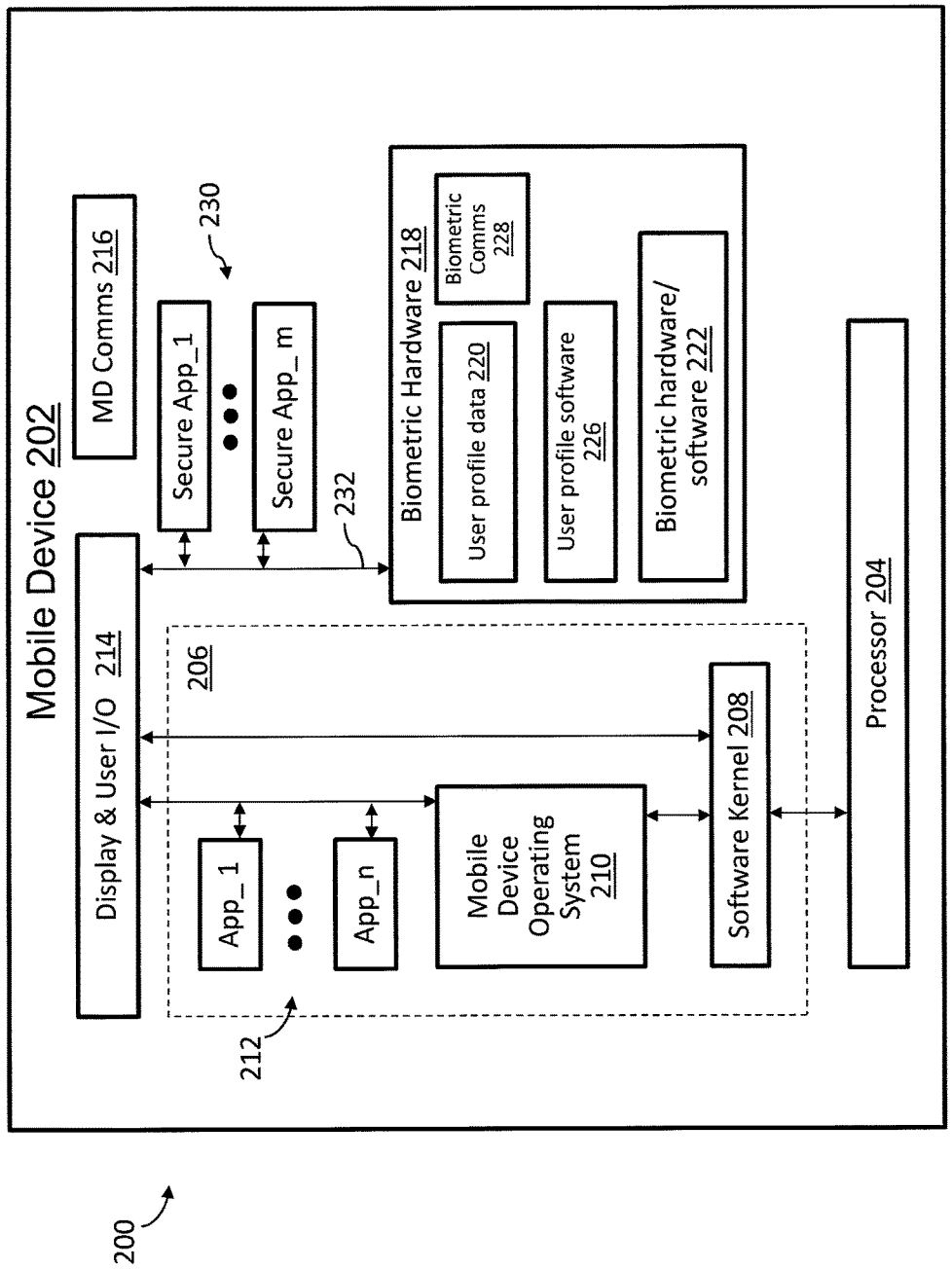
FIG. 2 is a block diagram illustrating various components of a mobile device, according to an embodiment.

FIG. 2 is a block diagram 200 illustrating various components of a mobile device 202, according to an embodiment. The mobile device 202 includes a processor 204 (e.g., CPU) and a memory 206. The memory 206 includes a software kernel 208, which connects to a mobile device operating system 210 (e.g., IOS9, among others) and to one or more applications 212 (i.e., shown as "App_1" to "App_n" in FIG. 2). The software kernel 208 and mobile device operating system 210 also connect to a display and user I/O (inputs/output) 214, such as a touch screen, etc. The software kernel 208 also connects to mobile device communication devices ("MD Comms") 216 that can communication with other devices or networks. Other elements or modules may also be included in the mobile device 202, but are omitted for clarity, e.g., GPS module, accelerometer, speakers, microphone, etc.

The mobile device 202 also includes biometric hardware 218. The biometric hardware 218 may include a biometric sensor, one or more storage devices, and one or more processors. The biometric hardware 218 includes biometric hardware/software 222. The biometric hardware/software 222 includes a sensor, hardware, and software that manages enrolling and storing user biometrics, and also provides processes for authentication of the user via comparing an input biometric to enrolled biometrics. The biometric hardware/software 222 may provide access to secure applications 230 (i.e., shown as "Secure App_1" to "Secure App_m" in FIG. 2) through biometric communications modules ("biometric Comms 228"), i.e., the secure applications 230 can be accessed via the user authenticating with a biometric. The secure applications 230 may be stored in the memory 206 or another storage device on the mobile device 202.

As also shown in FIG. 2, the biometric hardware 218 may include user profile data 220. A user may input user profile information for various networked devices via the mobile device 202, and the user profile information is stored in a storage device of the biometric hardware 218 as "user profile data" 220.

As described herein, in response to a request from a networked device or a secure applications 230 associated with a networked device, the dynamically updated user profile can be transmitted, optionally along with user biometric information (e.g., fingerprint), to the networked device. In some embodiments, not only is the fingerprint stored, but a dynamically updated user profile is stored with user preferences, such as age, a temperature of a car, a social security number, other PIN numbers, etc. After the user of the mobile device 202 has been authenticated, and upon request from a networked device or a secure applications 230 associated with a networked device, user profile software 226 can match the request to an appropriate user profile stored in the user profile data 220 and send the requested user profile through biometric communications modules ("biometric Comms 228") to the networked device. In some embodiments, the user profile software 226 also sends biometric information to the networked device.

As shown in FIG. 2, the biometric hardware 218 connects to any of a group of secure applications 230 and to the display and user I/O 214 (e.g., touch screen, etc.) via connection 232. In some implementations, the connection 232 does not go through the mobile device operating system 210, so user profile data (i.e., so-called "high value payload data") cannot be hacked if the mobile device operating system 210 is hacked. The high value payload data is almost impossible to hack without biometric access to the biometric hardware 218, unlike prior systems, where applications 212 or the mobile device operating system 210 can be hacked. Such high value payload data can be, but is not limited to, (1) a key code or certificate, (2) user data, such as security codes, (3) user preference data, such as "allow access only if with 100 miles of a geolocation," or (4) age, sex, maximum transaction size, and so on.

Figure 3:
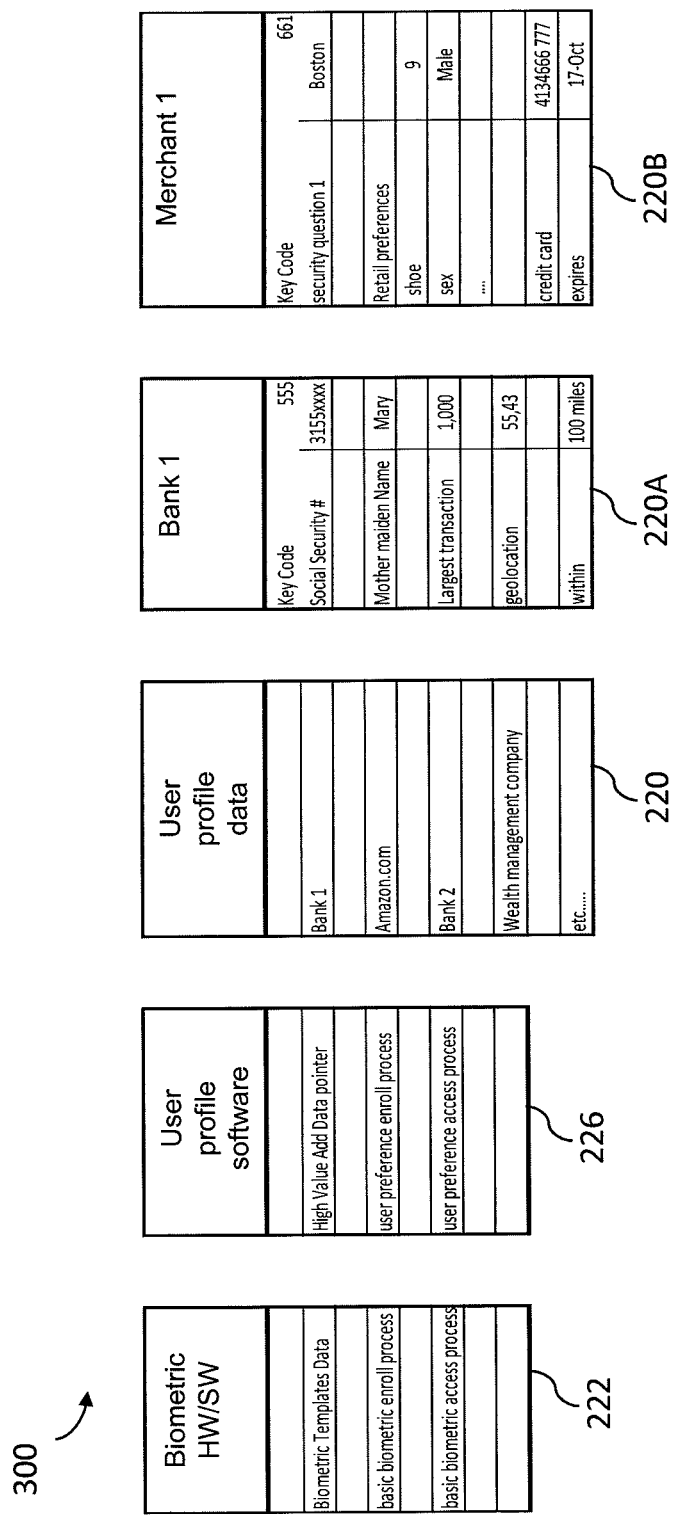
FIG. 3 is a block diagram showing various data structures for sharing user profile data, according to an embodiment.

FIG. 3 is a block diagram showing various data structures for sharing user profile data, according to an embodiment. The biometric hardware/software 222 includes example components for storing biometric template data, which comprises derived templates of biometric sensor data. The biometric hardware/software 222 also includes instructions for performing the basic biometric enrollment process, which allows a user to enroll their biometric information and create the biometric templates. The biometric hardware/software 222 also includes instructions for performing the biometric access process, which uses biometric Comms 228 to acquire a new biometric image and compare the new biometric image to the stored biometric template data to, for example, lock or unlock the mobile device 202 (and/or a secure application 230) based upon the comparison to the biometric templates.

The user profile software 226 includes pointers (i.e., so-called "high value add data pointers") that link an access request from a requestor (for example, from "Bank 1") to the corresponding user profile data file associated with the requestor. The user profile software 226 also includes instructions for performing a user profile enroll process that interacts with a secure application 230 or a networked device to obtain user data from the user and store the user data into the user profile data 220. The user profile software 226 also includes instructions for performing the user profile access process, in which user profile data 220 is accessed by a secure application 230 or a networked device.

The user profile data 220 stores user profiles corresponding to the various secure applications 230 or networked devices. In one implementation, the user profile data 220 includes a key code corresponding to a secure application or networked device, which is a code used to encrypt/scramble the user profile data 220. In one implementation, the secure device that stores the user profile data 220 encrypts the user profile data 220 using the key code. In another implementation, the networked device that receives the user profile data 220 encrypts the user profile data 220 using the key code. The key code is later used by the networked device to decrypt the user profile data 220.

FIG. 3 also shows examples of user profiles, such as user profile 220A (corresponding to "Bank 1") and user profile 220B (corresponding to "Merchant 1"). The user profiles 220A, 220B include various pieces of user information corresponding to a particular secure application or networked device. Note, in the example user profiles 220A, 220B shown, the various data is stored in an encrypted format (e.g., scrambled by a scrambling algorithm) using the key code, but the key code is not encrypted, as the key code is used to decrypt the various data.

Figure 4:
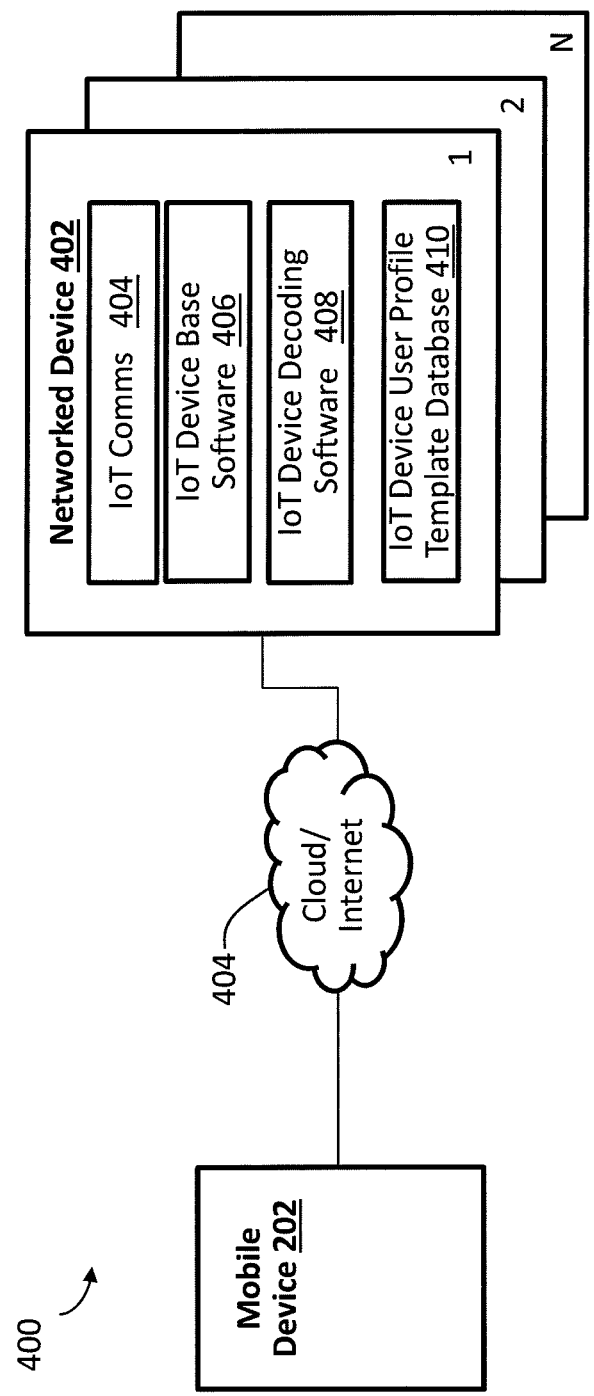
FIG. 4 is a block diagram illustrating a networked device in communication with a mobile device over a network, according to an embodiment.

FIG. 4 is a block diagram illustrating a networked device 402 in communication with a mobile device 202 over a network 404, according to an embodiment. The mobile 202 comprises a secure user device, such as secure user device 110. The network 404 may be any type of network, such as the Internet. Although one networked device 402 is described for illustration purposes, any number of N networked devices are also within the scope of the disclosure.

As described, a user can enroll a biometric template that is stored on the mobile device 202. Also, the user may enroll a user profile corresponding to a networked device 402 that is also stored on the mobile device. The user is also registered with the networked device 402, which stores a key code to decode the user profile data when the user profile data is received from the mobile device 202. In one implementation, the mobile device 202 executes a secure application 230, which continuously polls using the MD Comms 216 for a connection to a communication device ("IoT Comms") 404 associated with its related networked device 402 (e.g., a financial institution, a merchant, a wealth manager, etc.).

Once a connection is made, the networked device 402 (e.g., an ATM of Bank 1) requests access to the user profile using IoT base software 406 via the IoT Comms 404 of the networked device 402 to the related secure application 230 on the mobile device 202 (e.g., Bank 1 IoT device to Bank 1 secure application of the mobile device).

Once the biometric hardware/software 222 recognizes a biometric supplied by the user on the mobile device 202 by matching it to a template, the user profile software 226 runs to find the corresponding user profile in the user profile data 220. If there is a corresponding user profile in the user profile data 220, then the user profile (and optionally the biometric) is sent though the secure application 230 and MD Comms 216 to the IoT Comms 404. The IoT device decoding software 408 then decodes the user profile and stores the decoded data in the IoT device user profile template database 410 to complete a transaction. The networked device 402 may also verify the biometric received from the mobile device 202. After the transaction is complete, a new key code generated by the IoT device and is sent back to the mobile device 202 to store in the associated user profile data 220. The new key code for that user is also stored in the IoT user profile template database 410. The user profile data obtained from the secure application 230 is then deleted from the networked device 402. In this way, the user profile data is only stored in the secure biometric hardware on the mobile device 202, and is not maintained on the networked device 402.

Figure 5:
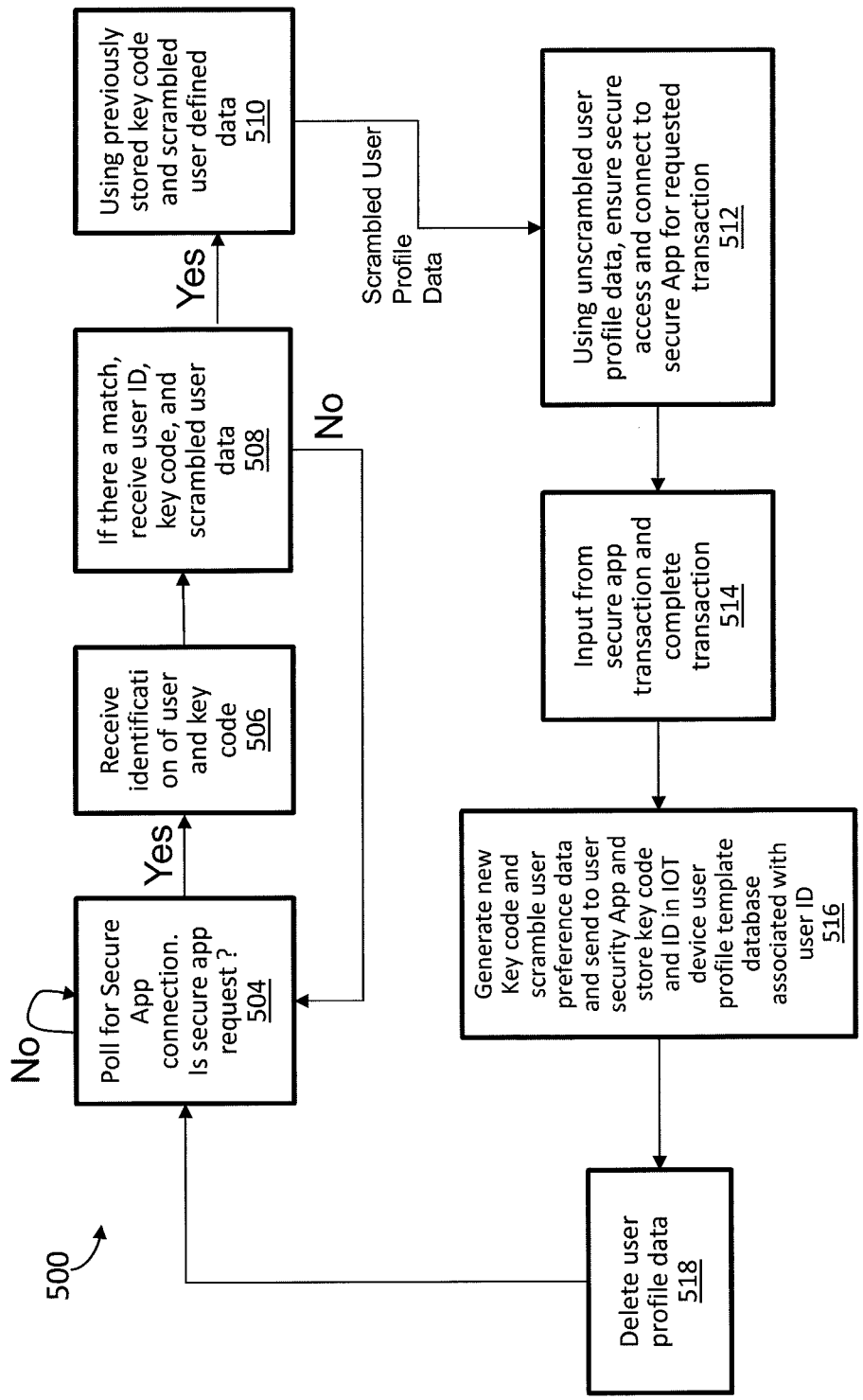
FIG. 5 is a flow diagram illustrating a method performed by an IoT device base software, according to an embodiment.

FIG. 5 is a flow diagram illustrating a method 500 performed by an IoT device base software 406, according to an embodiment. For example, the method is implemented by a processor included in a networked device that executes instructions stored in a memory.

At step 504, the processor of the IoT device polls for a connection to a secure application on a mobile device. If one is found, at step 506, the processor receives a user ID and a key code from the secure application, e.g., on a mobile device. The processor matches the user ID and the key code to a user profile template database. If there is a match, the IoT device receives encrypted user profile data and biometric data (step 508), and using the previously stored key code, the decoding software is executed (step 510) to decode the user profile data and biometric data. At step 512, using the unscrambled data, the processor ensures secure access (e.g., by verifying the biometric against a biometric template on the networked device) and connects to a secure application for the requested transaction using the unscrambled data. In some embodiments, an encrypted user profile is transmitted without biometric information, and biometric matching by the networked device is omitted.

At step 514, the processor applies the input from the user profile and completes the transaction (e.g., a mobile deposit). At step 516, a new key code is generated and sent to the secure application and also stored in the user profile match database. At step 518, the processor deletes the user profile data.

Figure 6:
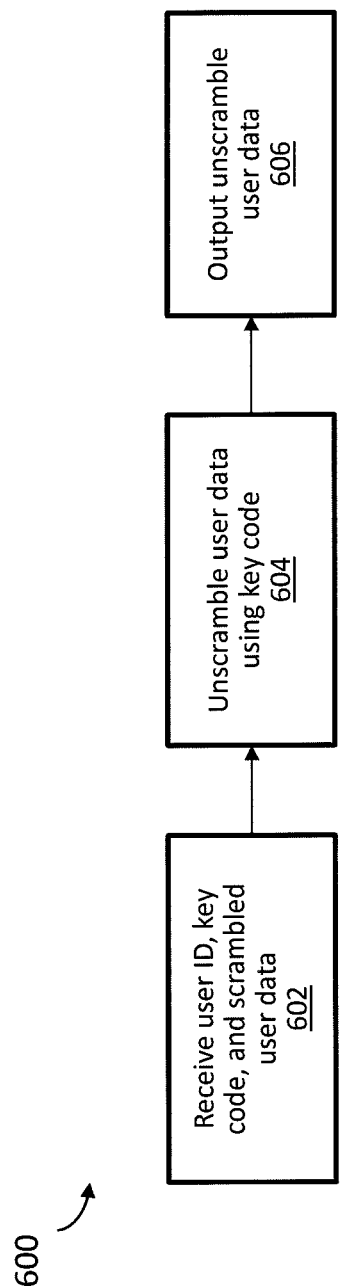
FIG. 6 is a flow diagram illustrating a method performed by device decoding software, where the software uses the key code to unscramble the user defined data, according to an embodiment.

FIG. 6 is a flow diagram illustrating a method 600 performed by IoT device decoding software 408, where the IoT device decoding software 408 uses the key code to unscramble the user data (e.g., user profile data and biometric data). At step 602, the IoT device decoding software 408 receives a user ID, a key code, and scrambled user data. At step 604, the IoT device decoding software 408 unscrambles (or "decodes" or "decrypts") the user data using the key code. At step 606, the IoT device decoding software 408 outputs unscrambled (or "decoded" or "decrypted") user data.

Figure 7:
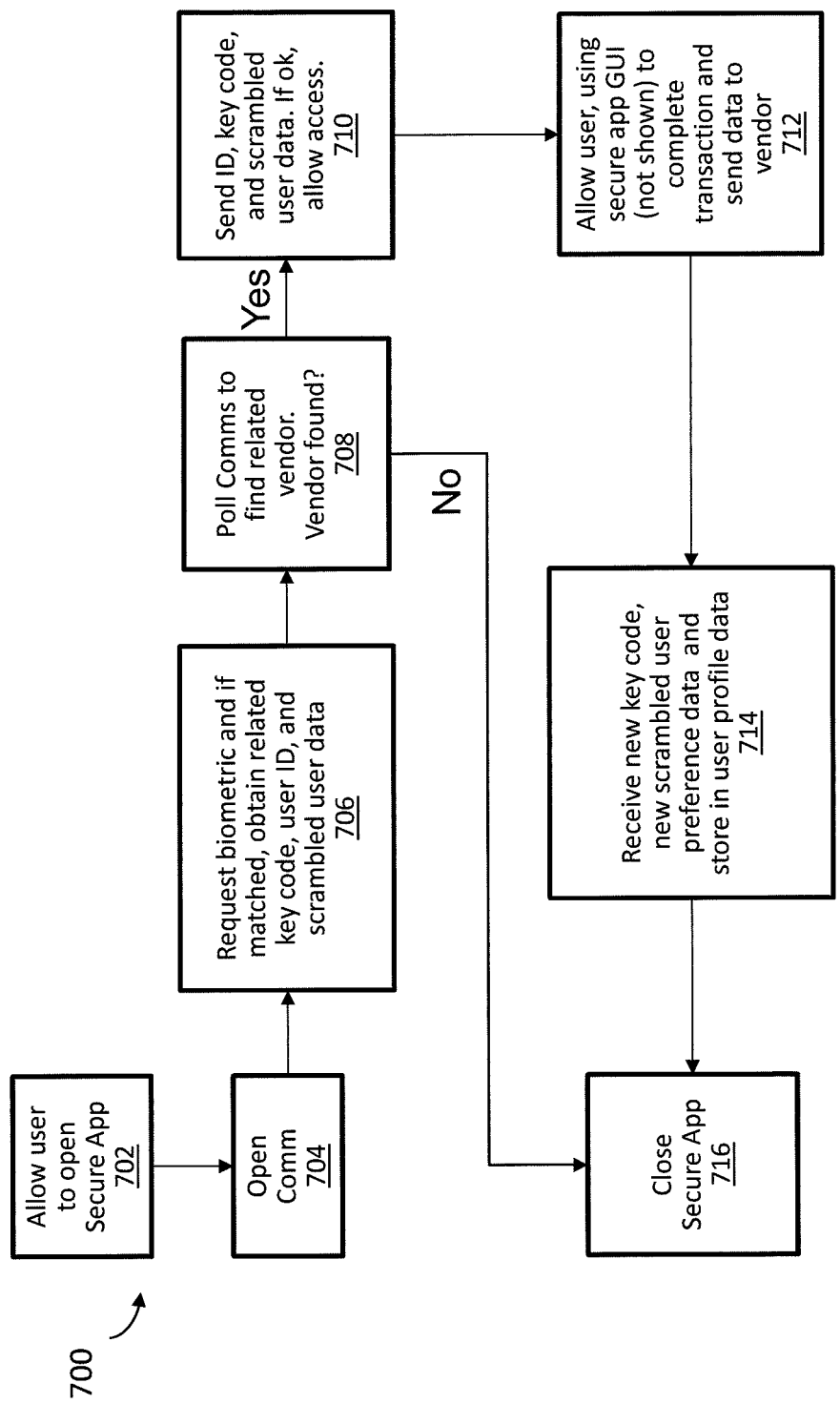
FIG. 7 is a flow diagram illustrating a method performed by a secure application on a secure user device, according to an embodiment.

FIG. 7 is a flow diagram illustrating a method 700 performed by a secure application 230 on a secure user device, according to an embodiment. The secure user device may be a mobile device 202. At step 702, a processor allows the user to open the secure application. At step 704, the processor opens a communication module (e.g., Comm 216).

As previously described, the processor may execute an enrollment of biometric data using the biometric enroll process of the biometric hardware/software 222. A user profile enrollment process of the user profile software 226 is also performed. The biometric hardware/software 222 uses an enrollment process to enroll the biometric and store the biometric as a template. The biometric hardware/software module 222 uses an access process each time a request is made for a biometric check, where the biometric is inputted, a template is retrieved, and the input is checked against the stored template.

Referring to FIG. 7, at step 706, the processor requests the biometric to unlock the mobile device (e.g., using the basic biometric access process of the biometric hardware/software module 222). If a match is found at step 706, a key code, user ID, and scrambled user data (e.g., user profile data and biometric data) are obtained.

At step 708, the processor polls the Comms (e.g., biometric Comms 228) to find a related vendor (i.e., a networked device). If no connection is found, the secure application is closed (step 716). If a vendor is found, then at step 710, the processor sends the user ID, the key code, and the scrambled user data to the related vendor, which is configured to unscramble the user data. In one embodiment, the user data includes an encrypted user profile. In another embodiment, the user data includes an encrypted user profile and encrypted biometric information. At step 712, the processor, using a secure application GUI completes the transaction and sends data to the vendor. At step 714, the processor receives a new key code from the vendor and new scrambled user profile data, and stores the new key code and the new scrambled user profile data in the user profile data 220. At step 716, the processor closes the secure application.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for authorizing access to networked devices, the method comprising:
    storing, on a user device, a plurality of profiles, wherein each profile of the plurality of profiles corresponds to a different networked device;
    storing, on the user device, enrolled user biometric information associated with a user;
    receiving, by the user device, biometric input from the user;
    matching, by the user device, the biometric input to the enrolled user biometric information;
    in response to matching, by the user device, the biometric input to the enrolled user biometric information, transmitting, by the user device to a first networked device, the biometric input from the user and a first profile of the plurality of profiles to control operation of the first networked device by applying one or more settings included in the first profile, wherein the first profile corresponds to the first networked device, and wherein the first networked device is part of an Internet of Things network of connected devices and is configured to verify the biometric input against a biometric template stored on the first networked device prior to applying the one or more settings included in the first profile.

2. The method of claim 1, wherein the first profile is stored on the user device in an encrypted format.

3. The method of claim 2, wherein the first profile is encrypted using a key code stored in the first profile.

4. The method of claim 3, wherein the first networked device is configured to decrypt the first profile using the key code.

5. The method of claim 1, wherein the user device comprises a mobile phone, wherein the first networked device comprises a vehicle, a smart thermostat, a smart house, or a smart light bulb.

6. A non-transitory computer-readable storage medium storing instructions that, when executed by a computing device, cause the computing device to authorize access to networked devices by performing the steps of:
storing, on a computing device, a plurality of profiles, wherein each profile of the plurality of profiles corresponds to a different networked device;
storing, on the computing device, enrolled user biometric information associated with a user;
receiving, by the computing device, biometric input from the user;
matching, by the computing device, the biometric input to the enrolled user biometric information;
in response to matching, by the computing device, the biometric input to the enrolled user biometric information, transmitting, by the computing device to a first networked device, the biometric input from the user and a first profile of the plurality of profiles to control operation of the first networked device by applying one or more settings included in the first profile, wherein the first profile corresponds to the first networked device, and wherein the first networked device is part of an Internet of Things network of connected devices and is configured to verify the biometric input against a biometric template stored on the first networked device prior to applying the one or more settings included in the first profile.

7. The computer-readable storage medium of claim 6, wherein the first profile is stored on the computing device in an encrypted format.

8. The computer-readable storage medium of claim 7, wherein the first profile is encrypted using a key code stored in the first profile.

9. The computer-readable storage medium of claim 8, wherein the first networked device is configured to decrypt the first profile using the key code.

10. The computer-readable storage medium of claim 6, wherein the computing device comprises a mobile phone, wherein the first networked device comprises a vehicle, a smart thermostat, a smart house, or a smart light bulb.

11. A user device, comprising:
a sensor configured to receive a biometric input;
a memory configured to store a plurality of profiles and enrolled user biometric information associated with a user, wherein each profile of the plurality of profiles corresponds to a different networked device; and
a processor configured to:
match the biometric input to the enrolled user biometric information,
in response to matching, by the processor of the user device, the biometric input to the enrolled user biometric information, cause the biometric input and a first profile of the plurality of profiles to be transmitted to a first networked device to control operation of the first networked device by applying one or more settings included in the first profile, wherein the first profile corresponds to the first networked device, and wherein the first networked device is part of an Internet of Things network of connected devices and is configured to verify the biometric input against a biometric template stored on the first networked device prior to applying the one or more settings included in the first profile.

12. The user device of claim 11, wherein the first profile is stored on the user device in an encrypted format.

13. The user device of claim 11, wherein the user device comprises a mobile phone.

14. The user device of claim 12, wherein the first profile is encrypted using a key code stored in the first profile.

* * * * *